United States Patent
Okamura et al.

[11] Patent Number: 5,900,325
[45] Date of Patent: May 4, 1999

[54] POLYESTER LAMINATED METAL SHEET

[75] Inventors: Takaaki Okamura, Yanai; Atsuo Tanaka; Tsuneo Inui, both of Tokuyama; Akio Miyachi, Kudamatsu, all of Japan

[73] Assignee: Toyo Kohan Co., Ltd., Tokyo, Japan

[21] Appl. No.: 08/901,819

[22] Filed: Jul. 28, 1997

Related U.S. Application Data

[63] Continuation of application No. 08/611,769, Apr. 10, 1996, abandoned, which is a continuation of application No. 08/101,995, Aug. 4, 1993, abandoned.

[51] Int. Cl.$^6$ .......................... B21D 39/00; B32B 15/04; B32B 27/28
[52] U.S. Cl. .......................... 428/623; 428/626; 428/632; 428/666; 428/339; 428/462; 428/469; 428/689
[58] Field of Search ...................... 428/666, 667, 428/626, 632, 684, 651, 339, 424.8, 462, 469, 523, 500, 689, 680

[56] References Cited

U.S. PATENT DOCUMENTS

| | | | |
|---|---|---|---|
| 4,143,790 | 3/1979 | Ueno et al. | 220/458 |
| 4,517,255 | 5/1985 | Kanda et al. | 428/626 |
| 4,614,691 | 9/1986 | Inui et al. | 428/623 |

FOREIGN PATENT DOCUMENTS

| | | | |
|---|---|---|---|
| 0544545 | 2/1993 | European Pat. Off. | 428/622 |
| 57-023584 | 5/1982 | Japan | 428/622 |
| 60-04058 | 2/1985 | Japan | 428/622 |

OTHER PUBLICATIONS

Metals Handbook, Ninth Edition, vol. pp. 457–458, Aug. 11, 1983.
Handbook of Plastic Materials & Technology pp. 634, 641, Nov. 6, 1990.
Polymer Processing & Applications Concise Encyclopedia of p. 506, (no date available).

*Primary Examiner*—David A. Simmons
*Assistant Examiner*—Linda L. Gray
*Attorney, Agent, or Firm*—Fulbright & Jaworski, LLP

[57] ABSTRACT

A polyester resin film laminated metal sheet having a metal sheet and a polyester resin film on at least one surface. The polyester resin film is 41 to 58 weight percent polybutyelene terephthalate and 42 to 59 weight percent polyethylene terephthalate. This composition provides the polyester resin film laminated metal sheet with an improved resistance to milky discoloration during retort treatment.

12 Claims, No Drawings

POLYESTER LAMINATED METAL SHEET

This application is a continuation of U.S. patent application Ser. No. 08/611,769, filed Apr. 10, 1996, abandoned, which is a continuation of U.S. patent application Ser. No. 08/101,995, filed Aug. 4, 1993, abandoned.

FIELD OF INVENTION

The present invention is directed to a polyester resin film laminated metal sheet, and to articles manufactured therefrom.

BACKGROUND OF THE INVENTION

Presently, metal sheet stock, for example, such as electrotinplate, tin free steel (TFS), and aluminum are widely used for can stock after applying one or more coats of lacquer. However, the employ of such a lacquer coating has associated drawbacks, including increased energy costs due to extended curing times, and the discharge of solvent during curing which must be disposed, for example, by incineration to prevent environmental pollution.

To avoid such problems as mentioned above, the lamination of a thermoplastic polyester resin film on a metal sheet has recently been described, for example, in U.S. Pat. No. 4,517,255, Laid-Open Japanese Patent Application No. Hei 3-212433, U.S. Pat. No. 4,614,691, and Japanese Patent Publication Nos. Sho 57-23584 and Sho 60-4058.

The polyester resin film laminated metal sheet according to these references are formed to a can by the following can making methods:

(1) One side of the laminate which is used for outside of the can is coated with lacquer or printing ink and then heated for curing the precoated lacquer or printing ink, at a temperature of about 160 to 220° C. for about 1 to about 20 minutes. After that, the laminate is formed to a can.

(2) After the laminate is formed to a can, the outside of the can is coated with lacquer or printing ink and then heated for curing the precoated lacquer or printing ink at a temperature of about 160 to about 220° C. for about 1 to about 20 minutes.

(3) The laminate is formed to a can without coating and heating.

The can obtained by each method (1)–(3) described hereinabove is treated by hot steam and hot water at 100 to 130° C. in a retort for the sterilization of foods packed therein.

In particular, in order to neck the upper part of the formed deeply drawn can having high can height such as a drawn and stretch formed can, the formed can is reheated for the relief of the increased internal stress in the laminated polyester resin film in the upper part of said formed can at a temperature of about 180 to about 220° C. for about 1 to about 4 minutes, because the internal stress in the laminated polyester resin film is accumulated in the formed part by the severe forming. If the aforesaid formed can is not reheated, the laminated polyester resin film is easily peeled off from the metal sheet by the necking of the upper side of the formed can.

Therefore, it is preferable that the polyester resin film laminated metal sheet used for a can which is formed by various methods described above is excellent in all characteristics inclusive of the formability, the adhesion of the polyester resin film to the metal sheet after severe forming and the appearance in the outside of the can after retort treatment. However, the laminate according to these references are not always excellent in all of the characteristics described above.

U.S. Pat. No. 4,517,255 describes a method for laminating a crystalline polyester resin film to a metal sheet heated to a temperature above the melting temperature of the polyester resin film, and thereafter immediately quenching the laminate. In this reference, the crystalline polyester resin film is said to be sufficiently adhered to the metal sheet by an amorphous non-oriented polyester resin layer which is formed at the interface of the crystalline polyester resin film and the metal sheet as a result of the heating step. However, when the laminate according to this reference is formed to a can by can making method (3) described above, and thereafter the formed can is treated in a retort for sterilization of foods packed therein, innumerable milky spots which deteriorate the commodity value of the packaging are observed on the outside of the can, although the laminated polyester resin film is not peeled off from the metal sheet. It is thought that such milky change is due to the difference of the recrystallization speed of the amorphous non-oriented polyester resin layer in the part contacting hot steam from that contacting hot water. If the surface of the polyester resin film laminated metal sheet is uniformly wetted by hot water or hot steam, the milky spots are not observed.

If the laminate according to this reference is formed to a can by the can making methods (1) or (2) described above, such milky change is not always observed in the outside of the can after retort treatment. However, a large spherulite of polyester resin grows by the recrystallization of the amorphous non-oriented polyester resin layer during heating the laminate or the obtained can for a long time. As the result, the laminated polyester resin film is easily peeled off from the metal sheet by severe forming.

Laid-Open Japanese Patent Application No. Hei 3-212433 describes a method for producing a copolyester film laminated metal sheet which is said to have excellent resistance to such milky change by a retort treatment. In particular, this reference is characterized by laminating a copolyester resin film consisting of 75 to 99 mole % of polyethylene terephthalate and 1 to 25 mole % of other polyester resin on a metal sheet at a temperature below the melting temperature and above the softening temperature of the copolyester resin film, and thereafter rapidly quenching the laminate in order to decrease the amount of the amorphous non-oriented copolyester resin layer formed as a result of the heating step during lamination, which causes the milky change by a retort treatment such as described above. In the method according to this reference, a small amount of the amorphous non-oriented polyester resin layer is inevitably formed between the surface of the metal sheet and the biaxially oriented copolyester resin layer. If the amorphous non-oriented copolyester resin layer is not formed at all, the laminated biaxially oriented copolyester resin film will not adhere to the metal sheet. Therefore, according to this reference, it is very difficult to obtain a polyester resin film laminated metal sheet which exhibits good adhesion and formability and does not exhibit a milky change during retort treatment, if the laminate is formed to a can by the can making method (3), because the copolyester resin melted at a temperature below the melting temperature and above the softening temperature of the employed copolyester resin film has high viscosity and the surface of the metal sheet is not uniformly wetted by the melted copolyester resin.

If the laminate according to this reference is formed to a can by the can making methods of (1) or (2), the laminated copolyester resin film in the formed part is easily peeled off from the metal sheet, because the adhesion of the laminated copolyester resin film is inferior to that set forth in U.S. Pat. No. 4,517,255.

It is possible experimentally to prevent the milky change of the laminate having an amorphous non-oriented polyester resin layer from occurring by the methods described in these patents set forth above by a use of special retort, wherein the laminate is usually in contact with hot steam or hot water only. However, these methods are not economical. Furthermore, this milky change may be also prevented by reheating the laminate before quenching at a temperature above the glass transition temperature for a long time, for example, at 160° C. for 120 seconds, in the production process of the polyester resin film laminated metal sheet. However, this reheating method is not suitable for the continuous production of the polyester resin film laminated metal sheet at high speed, and is not suitable from the standpoint of economy, because an addition of reheating equipment is necessary. Furthermore, such milky change is also prevented by the reheating of the laminate in the can making methods (1) or (2). However, the adhesion of the laminated polyester resin film to the metal sheet becomes poor by severe forming.

In the laminate according to U.S. Pat. No. 4,614,691, such milky change by a retort treatment is not observed in the outside of the can formed by the can making method (1) or (2). However, this milky change is slightly observed in the outside of the can formed by the can making method (3), because the presence of an amorphous non-oriented polyester resin layer which causes such milky change is substantially reduced as a result of lamination at a temperature below the melting temperature of the employed polyester resin film. However, the use of a polyester resin film precoated with the specified adhesive is an absolute requirement in this reference. Therefore, the method in this reference is disadvantageous from the standpoint of the material cost and the treatment of a large volume of solvent discharged during curing the precoated adhesive which causes air pollution.

Japanese Patent Publication No. Sho 57-23584 describes a metal structure covered with a thermoplastic polyester resin produced by esterification of dicarboxylic acid, in which terephthalic acid is at least 45 mole % of said dicarboxylic acid with diol in which 1,4-butane diol is at least 55 mole % of said diol. The polyester resin has a relative viscosity of 1.2 to 1.8, a tack point of not lower than 130° C., and a degree of crystallinity of up to 30%. In this reference a metal substrate is covered with a thermoplastic resin containing above 45 mole % of polybutylene terephthalate which has an amorphous non-oriented structure. Therefore, if the laminate according to this reference is formed to a can by the can making method (3) and the formed can is treated in a retort after packing foods, the outside of the can may become milky, because the laminated amorphous non-oriented layer is non-uniformly recrystallized by retort treatment. Further, when the laminate according to this reference is formed to a severe formed can such as a drawn and stretch formed can by the can making method (1) or (2), many cracks may arise in the severe formed part, because the biaxially oriented polyester resin having excellent formability is not present on the surface of the laminate according to this reference.

Additionally, Japanese Patent Publication No. Sho 60-4058 describes a can end produced by a polyester resin laminated metal sheet, which comprises heat bonding a polyester resin on a metal sheet, wherein the polyester resin is produced by esterification of dicarboxylic acid in which terephthalic acid is at least 66 mole % of said dicarboxylic acid with diol in which 1,4-butane diol is at least 45 mole % of said diol, and has an intrinsic viscosity of 0.7 to 2.8.

The can end according to this reference which is formed by the can making method (3) can not be used for the application in which excellent resistance to milky change by retort treatment is required, because an amorphous non-oriented structure is formed which is the same as that in Japanese Patent Publication No. Sho 57-23584. Further, if the can end according to this reference is obtained by the can making method (1) or (2), many cracks may arise in severe formed part such as the part double seamed to the can body.

As described above, the laminates according to these references do not have all of the characteristics required for the can which is treated in a retort after packing foods.

Accordingly, a primary objective of the present invention is to provide a polyester resin film laminated metal sheet which has improved resistance to such milky change as discussed above which is observed on the outside of a can after retort treatment for sterilization of the packed foods, and which also has improved adhesion of the laminated polyester resin film to a metal sheet and formability to can ends, can bodies in three piece cans, drawn and redrawn cans, drawn and stretch formed cans and screw caps.

It is another objective of this invention to provide an economical method for the continuous production of such a polyester resin film laminated metal sheet at high speed.

SUMMARY OF THE INVENTION

The aforesaid objectives are accomplished in accordance with the present invention, which provides a method for the production of a polyester resin film laminated metal sheet having excellent resistance to milky change by retort treatment, excellent adhesion of the laminated polyester resin film to the metal sheet after severe forming and excellent formability. The present invention comprises heat bonding a biaxially oriented polyester resin film having a fast crystallization speed, and in particular which consists of primarily polybutylene terephthalate and polyethylene terephthalate, or a biaxially oriented polyester resin film wherein a portion of the polyethylene terephthalate is substituted by polyethylene isophthalate, having specified characteristics on one or both sides of the surface of a treated metal sheet having excellent adhesion to the employed polyester resin film, and thereafter quenching.

More particularly, the present inventive method comprises heat bonding a biaxially oriented polyester resin film to one or both sides of a metal sheet having a coating of a single layer of hydrated chromium oxide or a double layer comprised of a lower layer of metallic chromium and an upper layer of hydrated chromium oxide. The biaxially oriented polyester resin film comprises about 10 to about 60 weight % of polybutylene terephthalate and about 40 to about 90 weight % of polyethylene terephthalate, and has a glass transition temperature of about 40 to about 70° C., and a minimum half crystallization time less than about 200 seconds on one or both sides of the metal sheet.

The present invention is more fully explained in accordance with the following detailed description, including preferred embodiments.

DETAILED DESCRIPTION OF THE INVENTION

In the present inventive method, a biaxially oriented polyester resin film is heat bonded to one or both sides of a metal sheet, which metal surface has been treated to preferably provide excellent adhesion properties for the polyester resin film, and the polyester resin film bonded metal sheet is thereafter quenched. The biaxailly oriented polyester resin film consists primarily of polybutylene terephthalate and polyethylene terephthalate, or a biaxially oriented polyester resin film in which a part of the aforesaid polyethylene terephthalate is substituted by polyethylene isophthalate.

In accordance with this invention, several characteristics of the polyester resin film bonded metal sheet are important and include the following:

(1) characteristics of the employed polyester resin film;
(2) characteristics of the polyester resin film after laminating to the metal sheet, especially the characteristics of the polyester resin layer contacting the surface of the metal sheet;
(3) use of the surface treated metal sheet which preferably has excellent adhesion to the laminated polyester resin film, and
(4) selection of laminating conditions in response to the characteristics of the employed polyester resin film.

In accordance with the present invention, all of the above-described factors are controlled within their respective preferred ranges, to obtain a polyester resin film laminated metal sheet having excellent resistance to milky change during retort treatment; excellent adhesion of the laminated polyester resin film to a metal sheet even after severe forming; and an excellent formability to drawn can having high can height such as drawn and stretch formed cans.

The present invention can be further summarized by laminating a biaxially oriented polyester resin film wherein the amorphous non-oriented layer formed between a biaxially oriented polyester resin film and the metal sheet immediately after laminating is recrystallized at an optimum and preferred speed before quenching the laminate.

The polyester resin film laminated metal sheet according to the present invention can be used for the outside of can stocks such as can ends, can bodies in three piece cans, drawn cans, drawn and redrawn cans, drawn and stretch formed cans having high can height and screw caps, all of which are treated with hot steam and hot water in a retort for the sterilization of the packed foods.

THE POLYESTER RESIN FILM

The polyester resin film laminated metal sheet according to the present invention is produced by heat bonding a biaxially oriented polyester resin film wherein the polyester resin film consists of about 10 to about 60 weight % of polybutylene terephthalate and about 40 to about 90 weight % of polyethylene terephthalate, and wherein the resin has a glass transition temperature of about 40 to about 70° C., and at least below 200 seconds of a minimum time for half crystallization to a metal sheet. Further, the metal sheet is covered with a single layer of hydrated chromium oxide or a double layer consisting of a lower layer of metallic chromium and an upper layer of hydrated chromium oxide. After bonding of the polyester resin film the polyester resin film bonded metal sheet is quenched.

In the process of the present invention, it is very important that at least a portion of the amorphous non-oriented polyester resin layer formed between a biaxially oriented polyester resin film and a metal sheet by heat bonding is recrystallized before quenching the resulting laminate. However, the composition and the characteristics of the polyester resin film used for the laminate formed by the can making method (1) or (2) are different from those for the laminate formed by the can making method (3), although the degree of the recrystallization of the polyester resin layer contacting with the metal sheet in the formed can before retort treatment after packing foods should be maintained in the same state. The state of the polyester resin layer contacting with the metal sheet is represented by the relative ratio of the density in the laminated polyester resin film (D) and is explained hereinbelow. First, however, the characteristics and the composition of the biaxially oriented polyester resin film used for the present invention are explained in detail.

The use of a biaxially oriented polyester resin film consisting of 10 to 60 weight % of polybutylene terephthalate and about 40 to 90 weight % of polyethylene terephthalate having a glass transition temperature of about 40 to about 70° C. and a minimum time for crystallization less than 200 seconds is preferable for the laminate formed by the can making method (1) or (2). On the other hand, for the laminate formed by the can making method (3), the use of a biaxially oriented polyester resin film consisting of about 40 to 60 weight % of polybutylene terephthalate and about 40 to about 60 weight % of polyethylene terephthalate, and having a glass transition temperature of about 40 to about 65° C. and a minimum time for half crystallization less than 20 seconds is preferable.

Namely, it is possible to use a polyester resin film having wide optimum ranges in both the composition and the minimum time for half crystallization for the laminate formed by the can making methods of (1) or (2), because a large amount of the amorphous non-oriented polyester resin layer which is formed in the production process of the polyester resin film laminated metal sheet is recrystallized by reheating in the can making methods of (1) or (2). However, it in most cases, it is impossible to use this polyester resin film for the laminate formed by the can making method (3), because the laminate is formed to a can without reheating in this method, and the amorphous non-oriented polyester resin layer which causes the milky change by a retort treatment remains without recrystallization.

On the other hand, the laminate formed by the can making method (3) can be also used for the laminate formed by the can making methods of (1) or (2), because it is thought that the amorphous non-oriented polyester resin layer formed in the production process is accelerated by the reheating in these can making methods.

In the polyester resin film laminated metal sheet according to the present invention, a decrease in the amount of polybutylene terephthalate leads to a poor resistance to milky change by a retort treatment or to a poor adhesion of the laminated polyester resin film after severe forming, because it is thought that some parts of amorphous non-oriented polyester resin formed in the production process of the polyester resin film laminated metal sheet remains by a decrease in the crystallization speed even if the reheating of the laminate is carried out in the can making methods of (1) or (2), or a large spherulite grows by the reheating of the laminate formed by either of these can making methods. On the other hand, an increase in the amount of polybutylene terephthalate leads to a poor surface appearance, and remarkable blocking oocurences of the coiled laminate by isolating of oligomer of the polyester resin film on the surface of the laminated polyester resin film. Furthermore, it is difficult industrially to produce a biaxially oriented polyester resin film with an increase in the amount of polybutylene terephthalate, because the crystallization speed of the extruded polyester resin film becomes very fast and the biaxial elongation of the extruded polyester resin becomes difficult.

For the reasons described above, the use of a polyethylene terephthalate consisting of 10 to 60 weight % of polybutylene terephthalate having a minimum time for half crystallization of at least below 200 seconds is preferable for the laminate formed by the can making methods of (1) or (2). It is more preferable to use a polyester resin film consisting of 20 to 60 weight % of polybutylene terephthalate and 40 to 80 weight % of polyethylene terephthalate having a minimum time for half crystallization of less than 100 seconds in this application. Further, it is indispensable to use a polyester resin film consisting of about 40 to about 60 weight % of polybutylene terephthalate and about 40 to about 60 weight % of polyethylene terephthalate having a minimum time for half crystallization of less than 20 seconds for the laminate formed by can making method (3). It is more preferable to use a polyester resin film consisting of 45 to 55 weight % of polybutylene terephthalate and 45 to 55 weight % of polyethylene terephthalate having a minimum time for half crystallization of about 0.5 to 12 seconds from the standpoint of stable and high speed production of the laminate according to the present invention.

The minimum time for half crystallization of the polyester resin film used in the present invention is defined as the minimum time for half crystallization of the polyester resin at a range in temperature wherein the employed polyester resin is crystallized. This property can be determined by using an apparatus for the measurement of polymer crystallization speed, for example, the apparatus having trade name MK-701 made by Kotaki Co., Ltd., and can be calculated by the following Avrami's equations:

$$1 - X = \mathrm{Exp}(-Kt^n)$$

$$1 - X = \frac{(It - Ig)}{(Io - Ig)}$$

where,

"X" represents the crystallinity of the employed polyester resin;

"K" re presents a constant for crystallization speed of the employed polyester resin;

"n" represents avrami index;

"t" represents time (seconds);

"Io" represents a transparent intensity of depolarized light at the starting point in the measurement, or more particularly Io represents a value which can be obtained after the melted polyester resin film is dropped into a silicon oil bath for crystallization and then kept for 10 seconds ;

"It" represents a transparent intensity of depolarized light after t seconds in the measurement, or more particularly It represents the value after 10+t seconds; and "Ig" represents a transparent intensity of depolarized light at the end point in the measurement, or Ig represents the value in which I-log t curve shows almost a straight line.

Furthermore, in the polyester resin film used in the present invention, a part of polyethylene terephthalate is substituted by polyethylene isophthalate or other polymer can also be used. However, much attention must be paid to the addition of these polymers. For instance, it is not preferable that the amount of polyethylene isophthalate added in the polyester resin film containing about 10 to about 60 weight % of polybutylene terephthalate is above about 15 mole % of polyethylene terephthalate, because the crystallization speed of this polyester resin film becomes slow with the increase in the amount of polyethylene isophthalate.

The glass transition temperature of the employed polyester resin film is also an important factor in the present invention. This glass transition temperature can be measured at a heating rate of 10° C./minute, for example, in a differential scanning calorimeter (SS10) made by Seiko Denshi Kogyo Co. In the present invention, it is necessary to use a polyester resin film having a glass transition temperature of about 40 to about 70° C. If the polyester resin film having a glass transition temperature of below about 40° C. is used, the piled up laminates begin to show remarkable blocking. Furthermore, the corrosion resistance of this polyester resin film laminated metal sheet becomes important, because this polyester resin film becomes poor in the barrierability. In the present invention, the upper limit of the glass transition temperature of the employed polyester resin film is automatically decided by the composition of the polyester resin film. Namely, the glass transition temperature of the employed polyester resin film is kept below about 70° C., because the amount of polybutylene terephthalate in the employed polyester resin film is preferably restricted to the range of about 10 to about 60 weight % from the point of the resistance to milky change by retort treatment. Although the polyester resin film having a glass transition temperature above about 70° C. can be produced by a decrease in the amount of polybutylene terephthalate blended in polyethylene terephthalate, such produced resin film becomes poor in the resistance to milky change by retort treatment.

The mechanical property of the employed polyester resin film is also an important factor from the stand point of formability of the polyester resin film. Specifically, the elongation at break of the polyester resin film, which can be determined at the speed of 100 mm/min. at 25° C. in an ordinary tensile testing machine, should be at least above 80%. If a polyester resin film having below about 80% of elongation at break is used for the present invention, many cracks arise in the laminated film by light forming to can ends, because the formability of said film becomes poor.

The preferable thickness of the polyester resin film used in the present invention is about 5 to about 80 μm, and more preferably about 10 to about 30 μm. If the thickness of the employed polyester resin film is below about 5 μm, good corrosion resistance after forming may not be obtained and the continuous lamination of the thin polyester resin film to the metal sheet may become difficult. The use of polyester resin film having a thickness above about 80 μm becomes economically undesirable for the film to be laminated to the metal sheet, because it is expensive as compared with epoxy phenolic lacquer widely used in the can industry.

It is also contemplated in this invention that additives such as antioxidants, stabilizer, antistatic agents, lubricants and corrosion inhibitors and other known additives and adjuvants in amounts known and desired for various performance characteristics can be added during the manufacturing process of the polyester resin film.

Secondly, the characteristics of the polyester resin film after lamination to the metal sheet will now be discussed.

In the present invention, it is preferable from the standpoints of the resistance to milky change by retort treatment, the adhesion to the metal sheet after forming and the corrosion resistance after forming, that the characteristics of the polyester resin film after lamination to the metal sheet are controlled by all of the following factors in some optimum and thus preferred range. These factors include:

(1) relative ratio of the density in the laminated polyester resin film; and (2) residual degree of biaxial orientation in the laminated polyester resin film.

The relative ratio of the density in the laminated polyester resin film can be determined as follows: Sample (a), (b) and (c) can be prepared by the following methods, respectively:

Sample (a): A polyester resin film laminated metal sheet is immersed into dilute hydrochloric acid solution at 25° C. After dissolution of the metal sheet, the obtained film is rinsed with water for 3 hours and then dried in a desiccator in the presence of silica gel (drying agent) for 1 day at 30° C.

Sample (b): The same polyester resin film laminated metal sheet as prepared in sample (a) is heated in a nitrogen atmosphere at a temperature of the melting temperature of said film +30° C. for 1 minute and then immediately immersed into liquid nitrogen. After that, the only laminated film is obtained by using the same method as in the preparation of sample (a).

Sample (c): The same polyester resin film laminated metal sheet as prepared in sample (a) is heated for 1 hour in a nitrogen atmosphere at a temperature where a maximum density is obtained within a range of crystallization temperature of the laminated polyester resin film. After that, a laminated film is obtained by using the same method as in the preparation of sample (a).

In samples prepared by the method described above, sample (b) corresponds to the state wherein the film has an almost amorphous non-oriented structure, and sample (c) corresponds to the state wherein the film has maximum crystallization structure.

The relative ratio of the density in the laminated polyester resin film (D) is calculated by the following equation by using the density of samples (a), (b) and (c) measured by a known method which uses a gradient density tube, respectively:

$$D\ (\%) = \{(Da-Db)/(Dc-Db)\} \times 100$$

where, Da, Db and Dc represent the density of sample (a), (b) and (c).

D calculated by the above equation represents the degree of the crystallization of the polyester resin layer contacting with the metal sheet.

In the present invention, D in the laminate formed by the can making method (1), (2) or (3) is preferably controlled within the range of about 35 to about 85%. If D is less than about 35%, it may become very difficult to prevent the milky change by retort treatment, because it is thought that a greater portion of the laminated biaxially oriented polyester resin film may change to the amorphous non-oriented layer and may not be recrystallized before quenching the laminate in the production process. However, in the laminate formed by the can making methods of (1) or (2), the lower limit of D in the laminate before forming by these methods may be acceptable. For instance, it may be acceptable that D is about 20%, because of the crystallization of the amorphous non-oriented polyester resin layer in the laminate process by the reheating in these methods. In the laminate formed by the can making method (3), D should be above about 35% after the lamination to the metal sheet in the production process of the laminate, because the reheating of the laminate is not carried out in this can making method. On the other hand, it is also preferable in the present invention that D is not more than about 85%, because many cracks arise in the laminated polyester resin film by the deterioration of the formability of the laminated film, specifically formability by impact forming. In the laminate formed by the can making methods of (1) or (2), it is more preferable that D is not more than 70%, because the recrystallization of the amorphous non-oriented polyester resin layer proceeds by the reheating.

Furthermore, the residual degree of biaxial orientation (BO) is also important factor in the present invention. This BO is determined by the following procedures.

(1) the X-ray diffraction intensity of the polyester resin film before and after lamination to the metal sheet is measured within the range of $2\Theta = 20°$ to $30°$;

(2) a point at $2\Theta = 20°$ and $2\Theta = 30°$ is connected by a straight line, and this line is designated as the base line;

(3) a height of the peak appearing in $2\Theta = 23°$ to $29°$ of the diffraction intensity curve from the base line is measured; and the height in the polyester resin film before and after lamination to the metal sheet is represented by Ia and Ib, respectively; and (4) a residual degree of biaxial orientation (BO) is represented by the following equation:

$$BO\ (\%) = Ib/Ia \times 100$$

In the present invention, if BO is less than about 5%, the formability of the laminated polyester resin film may become poor. In the case of BO greater than about 85%, the adhesion of the laminated polyester resin film to the metal sheet may become poor. Therefore, BO is preferably controlled to a range of about 5 to about 85%, and more preferably about 10 to about 50% in severe forming.

THE METAL SUBSTRATE

Metal sheet useful in this invention can be steel sheet, tin plated steel sheet, nickel plated steel sheet and aluminum sheet. Further, in accordance with the present invention, to provide the desired excellent adhesion properties of the metal sheet to the polyester resin film, the metal sheet is covered with a single layer of hydrated chromium oxide or a double layer consisting of a lower layer of metallic chromium and an upper layer of hydrated chromium oxide.

The amount of plated tin and plated nickel in the metal sheet is preferably below about 5.6 g/m$^2$ and about 3.0 g/m$^2$, respectively, for reasons of economy. However, if the amounts of plated tin and plated nickel are below about 0.05 g/m$^3$, the effect of plated tin or nickel on such characteristics, for example, as corrosion resistance to the packed food, is hardly apparent, despite the addition of a further plating process.

As mentioned above, it is an important factor in the present invention that the employed metal sheet is covered with a single layer of hydrated chromium oxide or a double layer consisting of a lower layer of metallic chromium and an upper layer of hydrated chromium oxide, in order to obtain an excellent adhesion of the laminated polyester resin film to the metal sheet after forming to can ends, drawn cans and drawn and stretch formed cans.

The preferred chromium amount contained in hydrated chromium oxide is about 5 to about 25 mg/m$^2$ in the single layer or the double layer. The amount of metallic chromium is about 10 to about 150 mg/m$^2$. If the chromium amount contained in hydrated chromium oxide is below about 5 mg/m$^2$ or above about 25 mg/m$^2$, the adhesion of the laminated polyester resin film to the metal sheet may become poor after forming even if the amount of metallic chromium is about 10 to about 150 mg/m$^2$, when the polyester resin film laminated metal sheet is exposed to hot steam and hot water in a retort. It is preferable that metallic chromium is deposited because the adhesion of the laminated polyester resin film to the metal sheet and the corrosion resistance of the obtained laminate are improved.

However, the deposition of metallic chromium above about 150 mg/m$^2$ is unnecessary in the present invention, because the corrosion resistance is not substantially improved.

When the polyester resin film laminated metal sheet in accordance with the present invention is used for can stock wherein high corrosive foods and beverages are packed and treated with hot steam and hot water in a retort, the polyester resin film, wherein one side of said polyester resin film contacting with the metal sheet is precoated uniformly and thinly with a thermosetting resin such as epoxy-phenolic resin, may be laminated on the surface treated metal sheet or the polyester resin film may be laminated on the surface of the metal sheet precoated with the thermosetting resin described above. However, such precoating with a thermosetting resin on an employed polyester resin film or the employed metal sheet may be expensive.

PRODUCTION OF THE POLYESTER RESIN FILM LAMINATED METAL SHEET

In accordance with the present inventive method the biaxially oriented polyester resin film having the above-described characteristics is continuously heat bonded to a surface of the metal sheet under conditions wherein the temperature of the metal sheet to be laminated by the polyester resin film, the thickness of the employed metal sheet, the thickness of the employed polyester resin film, the surface temperature of the employed laminating roll, the pressure added to the laminating roll, and the time until cooling the laminate after lamination are all controlled within preferred ranges in response to the recited characteristics of the employed polyester resin film.

In particular, it is important and very much preferred in the present invention that the metal sheet to be laminated with the polyester resin film is maintained at a temperature above the melting temperature of the employed polyester resin film, and the surface temperature of a laminating roll is controlled at a temperature below the melting temperature of the employed polyester resin film. If the temperature of the metal sheet is below the melting temperature of the employed polyester resin film, the laminated polyester resin film may not be sufficiently adhered to the metal sheet and can be peeled off from the metal sheet by light forming. Furthermore, if the surface temperature of the laminating roll is at a temperature above the melting temperature of the employed polyester resin film, the continuous and stable production of the polyester resin film laminated metal sheet according to the present invention may become very difficult, because the outside of the laminated polyester resin film can be melted by heat transmitted from the laminating roll and thereby adhere to the laminating roll.

Generally, it is also preferred in the production of the polyester resin film laminated metal sheet according to the present invention that a polyester resin film having higher degree of biaxial orientation is laminated on the metal sheet heated to higher temperature. In the use of a thinner polyester resin film or the use of thicker metal sheet, it is preferable to decrease a surface temperature of the metal sheet or laminating roll. Namely, it is important in the present invention that the factors which effect the characteristics of the laminated polyester resin film are controlled to be within a preferred optimum range.

The method for heating the metal sheet to be laminated with the polyester resin film is not restricted in the present invention. However, from the standpoint of the continuous and stable production of the laminate at high speed, conduction heating by rolls heated by induction heating, induction heating and/or resistance heating which are used for reflowing electroplated tin in the production process of electrotinplate are suitable as a method for heating the metal sheet, because the metal sheet can be rapidly heated and the temperature of the heated metal sheet can be easily controlled. Furthermore, it is also preferable in the present invention that heating with a roll heated by hot steam or heating in an electric oven can be used as an auxiliary method for preheating the metal sheet to be laminated.

The present invention is explained in further detail by the following examples. It is to be understood, however, that these examples are for illustrative purposes only and are not intended to limit the scope of the invention or claims and spirit thereof in any way.

EXAMPLE 1

A biaxially oriented polyester resin film consisting of 50 weight % of polybutylene terephthalate and 50 weight % of polyethylene terephthalate having a thickness of 12 $\mu$m, a minimum time for crystallization of 7.5 seconds, a glass transition temperature of 49° C. and an elongation at break of 122% was laminated by using a pair of laminating rolls wherein the surface temperature was 120° C. on both sides of a TFS strip. The TFS strip had a thickness of 0.22 mm and a width of 250 mm, and a coating of metallic chromium of 105 mg/m$^2$ and hydrated chromium oxide of 17 mg/m$^2$ chromium which had been heated to 250° C. by using a pair of rolls heated by induction heating at a laminating speed of 25 m/min. After four seconds, the laminate was quenched in water having a temperature of 35° C.

EXAMPLE 2

A biaxially oriented polyester resin film consisting of 41 weight % of polybutylene terephthalate and 59 weight % of polyethylene terephthalate which had a thickness of 12 $\mu$m, a minimum time of half crystallization of 20 seconds, a glass transition temperature of 58° C. and an elongation at break of 128% was laminated on both sides of the same TFS strip as in Example 1 under the same conditions as in Example 1. After 10 seconds, the laminate was quenched in water having a temperature of 35° C.

EXAMPLE 3

A biaxially oriented polyester resin film consisting of 58 weight of polybutylene terephthalate and 42 weight % of polyethylene terephthalate which had a thickness of 12 $\mu$m, a minimum time of half crystallization of 2.8 seconds, a glass transition temperature of 42° C. and an elongation at break of 121% was laminated on the same TFS strip as in Example 1 under the same conditions as in Example 1. After four seconds, the laminate was quenched in water having a temperature of 35° C.

EXAMPLE 4

A biaxially oriented polyester resin film consisting of 30 weight % of polybutylene terephthalate and 70 weight % of copolymerized polyethylene terephthalate containing 9 mole % of polyethylene isophthalate which had a thickness of 15 $\mu$m, a minimum time for half crystallization of 80 seconds, a glass transition temperature of 61° C. and an elongation at break of 132% was laminated by using a pair of laminating rolls wherein the surface temperature was 117° C. on both sides of the same TFS strip as in Example 1, which had been heated to 233° C. by using a pair of rolls heated by induction heating at a laminating speed of 100 m/min. After one second, the laminate was quenched in water having a temperature of 35° C.

EXAMPLE 5

A biaxially oriented polyester resin film consisting of 15 weight % of polybutylene terephthalate and 85 weight % of polyethylene terephthalate having a thickness of 20 µm, a minimum time for half crystallization of 34 seconds, a glass transition temperature of 68° C. and an elongation at break of 115% was laminated by using a pair of laminating rolls, wherein the surface temperature was 140° C. on both sides of the same TFS strip as in Example 1, which had been heated to 265° C. by using a pair of rolls heated by induction heating at a laminating speed of 60 m/min. After two seconds, the laminate was quenched in water having a temperature of 50° C.

EXAMPLE 6

A cold rolled steel strip having a thickness of 0.22 mm was electrolytically degreased and then pickled under known conditions. The steel strip, after rinsing with water, was electroplated with 1.5 g/m² of tin by using a tinplating electrolyte consisting of 80 g/l of stannous sulfate, 60 g/l of phenolsulfonic acid (65% solution) and 0.06 g/l of ethoxylated α-naphthol in water under 20 A/dm² of cathodic current density at an electrolyte temperature of 45° C. After rinsing with water, TFS film consisting of an upper layer of hydrated chromium oxide containing 13 mg/m² of chromium and a lower layer of metallic chromium of 80 g/m² was formed by cathodic treatment of both sides of the tin plated steel strip by using an electrolyte consisting of 50 g/l of chromic acid and 0.5 g/l of sulfuric acid in water under 40 A/dm² of cathodic current density at an electrolyte temperature of 50° C. The thus treated tin plated steel strip was rinsed with hot water and dried.

The same polyester resin film as in Example 1 was laminated on both sides of the tin plated steel strip described above under the same conditions as in Example 1. After six seconds, the laminate was quenched in water.

Comparative Example 1

A biaxially oriented polyethylene terephthalate film having a thickness of 12 µm, a glass transition temperature of 74° C., a minimum time for half crystallization of 42 seconds and an elongation at break of 130% was laminated by using a pair of laminating rolls and a surface temperature of 130° C. on both sides of the same TFS strip as in Example 1 which had been heated to 287° C. by using a pair of rolls heated by induction heating at laminating speed of 25 m/min. After 10 seconds, the laminate was quenched in water having a temperature of 50° C.

Comparative Example 2

A biaxially oriented copolymerized polyethylene terephthalate containing 12 mole % of polyethylene isophthalate which had a thickness of 12 µm, a glass transition temperature of 72° C., a minimum time for half crystallization of 318 seconds and an elongation at break of 139% was laminated by using a pair of laminating rolls wherein the surface temperature of 128° C. on both sides of the same TFS strip as in Example 1 which had been heated to 233° C. at laminating speed of 100 m/min and then immediately quenched in water having a temperature of 50° C.

The characteristics of the samples obtained by Examples 1–6 and comparative examples 1 and 2 were evaluated by the following testing methods, after D and BO in the polyester resin layer which was just before retort treatment was determined by using the equations described in the specification of the present invention.

Some samples were evaluated after reheating at 220° C. for 2 minutes.

The results are shown in Table 1 below.

(1) ADHESION OF THE LAMINATED POLYESTER RESIN LAYER AFTER FORMING

The resultant laminate was cut to a circular blank having a diameter of 187 mm by a punch press. The blank was formed to a drawn and stretch formed can under the following forming conditions:

Forming conditions
A. Drawing process
  Drawing ratio: 1.50
B. Redrawing process
  First redrawing ratio: 1.29
  Second redrawing ratio: 1.24
  Third redrawing ratio: 1.20
  Curvature radius in a corner of dies used for redrawing process: 0.4 mm
  Load for preventing wrinkle: 6000 kg
C. Average ratio of a thickness of metal sheet in can body to can end: −20%

The adhesion of the laminated polyester resin film to the metal sheet was visually evaluated as to the degree of the peeling off of the resin layer in a cup obtained in each redrawing process.

(2) RESISTANCE TO MILKY CHANGE BY A RETORT TREATMENT

The resulting laminate was cut to a size of 50 mm×100 mm. The cut sample was placed on stainless steel sheet having a temperature of about 20 to about 30° C., and then was treated by hot steam having a temperature of 120° C. for 30 minutes in a retort. After that, the surface appearance of sample exposed to hot steam was visually evaluated.

(3) FORMABILITY

The formability of the laminated polyester resin layer was evaluated by a current value between anode of the metal exposed through cracks of the laminated polyester resin layer in an inside of the obtained drawn and stretch formed can by (1) in which 3% of sodium chloride solution was filled and a cathode of stainless steel rod inserted in the can at a constant voltage of 6.3 volts.

TABLE 1

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Characteristics of the employed film |  |  |  |  |  |  |  |  |
| PBT (%) | 50 | 41 | 58 | 30 | 15 | 50 | 0 | 0 |
| PET (%) | 50 | 59 | 42 | (70) | 85 | 50 | 100 | (100) |
| Tc (sec) | 7.5 | 20 | 2.8 | 80 | 34 | 7.5 | 42 | 318 |
| Tg (° C.) | 49 | 58 | 42 | 61 | 68 | 49 | 74 | 72 |
| Lami. conditions |  |  |  |  |  |  |  |  |
| Temp. of metal sheet (° C.) | 250 | 250 | 250 | 233 | 265 | 250 | 287 | 233 |
| Temp. of lami. roll (° C.) | 120 | 120 | 120 | 117 | 140 | 120 | 130 | 128 |
| Time until quenching (sec) | 4 | 10 | 4 | 1 | 2 | 6 | 10 | 1 |
| Reheating before retort treatment | No | No | No | Yes | Yes | Yes | No | Yes |
| Characteristics of the film just before retort treatment |  |  |  |  |  |  |  |  |
| D (%) | 59 | 65 | 52 | 42 | 74 | 81 | 31 | 28 |
| BO (%) | 64 | 73 | 54 | 13 | 82 | 79 | 15 | 11 |
| Properties |  |  |  |  |  |  |  |  |
| Adhesion | Good | Good | Good | Good | Good | Good | Poor | Good |
| Milky resistance | Good | Good | Good | Good | Good | Good | Poor | Poor |
| Formability (mA) | 0 | 0 | 0.02 | 0.02 | 0.01 | 0 | — | 0.15 |

Remarks
*PBT, PET represent Polybutylene terephthalate and polyethylene terephthalate, respectively.
*D represents a relative ratio of density
*BO represents a residual degree of biaxial orientation.
*( ) represents copolymerized polyethylene terephthalate containing polyethylene isophthalate.
*— represents no measurement of current as the laminated polyester film was peeled off.

What is claimed is:

1. A polyester resin film laminated metal sheet resistant to milky discoloration, the polyester resin film having a relative ratio of density (D) of 35 to 85% and residual degree of biaxial orientation (BO) of 5 to 85% in the laminate before retort treatment after lamination and before quenching of a biaxially oriented polyester resin film, comprising a polyester resin film comprising from 41 to 58 weight % of polybutyelene terephthalate and from 42 to 59 weight % of polyethylene terephthalate and having a glass transition temperature of 40 to 70° C., to at least one side of a metal sheet covered with a single layer of hydrated chromium oxide or a double layer consisting essentially of a lower layer of metallic chromium and an upper layer of hydrated chromium oxide, wherein D is calculated by the following equation (1):

$$D (\%) = \{(Da-Db)/(Dx-Db)\} \times 100 \quad (1);$$

where Da represents the density of the polyester resin film which is peeled off from said polyester resin film laminated metal sheet; and, where Db represents the density of the polyester resin film which is peeled off from said polyester resin film laminated metal sheet after heating in a nitrogen atmosphere at a temperature of the melting temperature of said polyester resin film +30° C. for one minute and then immediately quenched into liquid nitrogen and, where Dc represents the density of the polyester resin film which is peeled off from said polyester resin film laminated metal sheet after heating for about one hour in a nitrogen atmosphere at a temperature where the maximum density is obtained with a range of crystallization temperature of the polyester resin film and then gradually quenched; and, wherein BO is calculated by the following equation (2)

$$BO (\%) = Ib/Ia \times 100 \quad (2);$$

where Ia represents a height of the peak appearing in 2θ=23° to 29° of the diffraction curve from the base line which is connected by straight line between a point of 2θ=20° and a point of 2θ=30° in a polyester resin film before lamination, and where Ib represents the same height described above in a polyester resin film after lamination to a metal sheet.

2. The laminated metal sheet of claim 1, wherein said polyester resin film has a minimum time for half crystallization less than 200 seconds.

3. The laminated metal sheet of claim 2, wherein said polyester resin film has a minimum time for half crystallization of about 0.5 to about 12 seconds.

4. The laminated metal sheet of claim 3, wherein said metal sheet is selected from the group consisting of a steel sheet, a tin plated steel sheet, a nickel plated steel sheet and aluminum sheet.

5. The laminated metal sheet of claim 4, wherein said metal sheet is a nickel plated steel sheet with about 0.05 to about 3.0 g/m$^2$ of nickel.

6. The laminated metal sheet of claim 3, wherein the chromium amount contained in hydrated chromium oxide layer is 5 to 25 mg/m$^2$ as chromium in said single layer or said double layer.

7. The laminated metal sheet of claim 3, wherein the metal sheet has said double layer formed thereon and the double layer has a metallic chromium content of 10 to 150 mg/m$^2$.

8. The laminated metal sheet of claim 1, wherein said metal sheet is selected from the group consisting of a steel sheet, a tin plated steel sheet, a nickel plated steel sheet and an aluminum sheet.

9. The laminated metal sheet of claim 3, wherein said metal sheet is a tin plated steel sheet with about 0.05 to about 5.6 g/m² of tin.

10. The laminated metal sheet of claim 1, wherein the amount of hydrated chromium oxide is about 5 to about 25 mg/m² as chromium in said single layer or said double layer.

11. The laminated metal sheet of claim 1, wherein the amount of metallic chromium is about 10 to about 150 mg/m² in said double layer.

12. A polyester resin film laminated metal sheet comprising:

a metal sheet comprising at least one chromium containing layer selected from the group consisting of a single layer of hydrated chromium oxide and a double layer consisting essentially of a lower layer of metallic chromium and an upper layer of hydrated chromium oxide, and a polyester resin film comprising from 41 to 58 weight % of polybutyelene terephthalate and from 42 to 59 weight % of polyethylene terephthalate and having a glass transition temperature of 40 to 70° C., wherein said polyester resin film is adhered to at least one side of said metal sheet.

* * * * *